United States Patent
Kadono et al.

[15] 3,701,189
[45] Oct. 31, 1972

[54] METHOD OF FIXING A BEARING CUP IN A HOOKE'S TYPE UNIVERSAL JOINT

[72] Inventors: Yoji Kadono; Yukio Ogasawara; Keizo Kamo, all of Totota, Japan

[73] Assignee: Toyota Jidosha Kogyo Kabushiki Kaisha, Toyota-shi, Aichi-ken, Japan

[22] Filed: May 19, 1971

[21] Appl. No.: 144,749

[30] Foreign Application Priority Data

May 21, 1970  Japan ................... 45/42835

[52] U.S. Cl. .......................... 29/148.4 A, 29/434
[51] Int. Cl. ...................... B23p 11/00, B23p 19/00
[58] Field of Search ...29/148.4 A, 434, 148.4 R, 438

[56] References Cited

UNITED STATES PATENTS 2,397,585   4/1946   Anderson ............... 29/434 X
3,062,026   11/1962  Pitner ................ 29/148.4 A X Primary Examiner—Thomas H. Eager
Attorney—Toren and McGeady

[57] ABSTRACT

In securing a bearing cup in a hole in the yoke of a Hooke's type universal joint, another hole having a diameter slightly greater than the diameter of the bearing cup hole is drilled in the yoke concentric with the bearing cup hole and to a depth so that the bases of both holes are in a common plane. After inserting the bearing cup into its hole so that its end is spaced a short distance from the common plane of the bases of the holes, a tool having a diameter slightly greater than the diameter of the bearing cup hole is positioned within the other hole and is rotated while it exerts pressure against the surface of the yoke in the common plane of the bases of the holes for deforming the wall of the bearing cup hole inwardly between the common plane and the end of the bearing cup for securely fixing the bearing cup in place.

7 Claims, 4 Drawing Figures

PATENTED OCT 31 1972 3,701,189
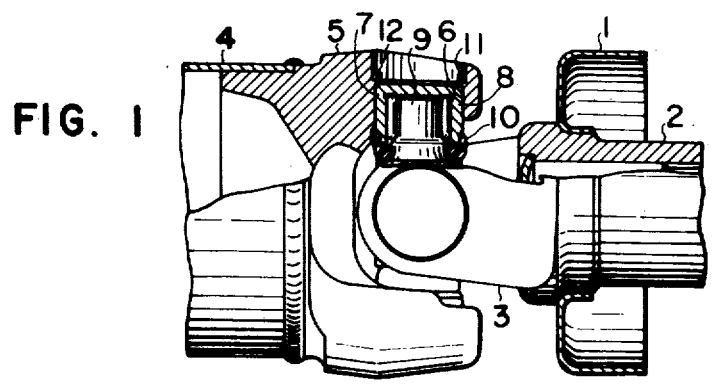
FIG. 1
FIG. 2
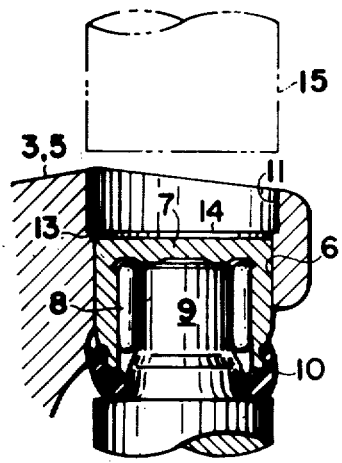
FIG. 3
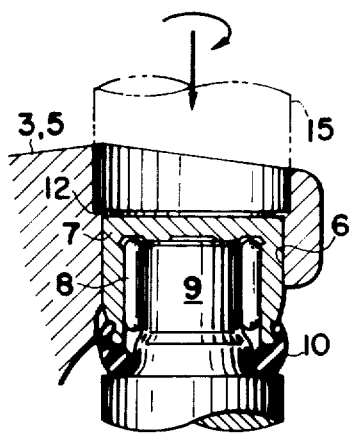
FIG. 4
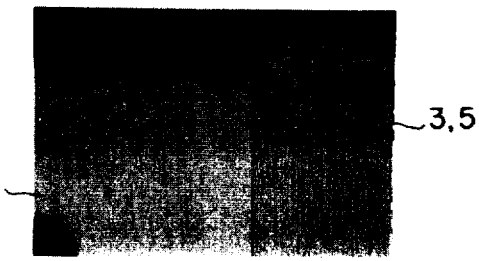
INVENTORS
YOJI KADONO
YUKIO OGASAWARA
KEIZO KANO
By Toren & Montgomery
Attorney

3,701,189

METHOD OF FIXING A BEARING CUP IN A HOOKE'S TYPE UNIVERSAL JOINT

SUMMARY OF THE INVENTION

The present invention is directed to Hooke's type universal joints used with a propeller shaft or the like for installation between a transmission and a final drive differential gear unit of a front-engine, rear-drive automobile and, more particularly, it concerns a method of fixing a bearing cup for a shaft within the input and output yoke of the joint.

In Hooke's type universal joints a cross-type shaft is mounted within needle roller bearings in the bearing cups. The bearing cups are fixed into bearing cup holes in yokes and are secured by means of snap rings positioned in a groove formed in the bearing cup hole. In this method of assembling the bearing cup into the yoke, the groove required for the snap ring necessitates a complicated machining process in forming the bearing cup holes. Moreover, it is necessary to select a suitable snap ring based on the accuracy of the machining of the various parts of the Hooke's type joint and this requirement further complicates the process of assembling the bearing cup in the yoke. However, the feature which most complicates the assembly of such a joint is a gap which is formed in the groove between the snap-ring and the bearing cup hole and it has not been possible to eliminate this gap. Accordingly, when the universal joint is rotated, the snap ring, bearing cup, and cross-type shaft move within the gap and, as a result, balancing of the driving system is obstructed and vibrations are developed.

Therefore, the primary object of the present invention is to provide a method of fixing a bearing cup within the yoke in a Hooke's-type universal joint for avoiding the above-described disadvantages.

In accordance with the present invention, a bearing cup is fixed within the yoke of a Hooke's-type universal joint by drilling a hole into the surface of the yoke opposite the bearing cup hole to a depth so that the base of the bearing cup hole and of the drilled hole are in a common plane. By forming the drilled hole with a diameter slightly larger than the bearing cup hole a shoulder is formed in the base of the drilled hole. After inserting the bearing cup into its corresponding hole and spacing it a short distance from the shoulder defining the periphery of the base of the drilled hole, a tool having a diameter slightly greater than the diameter of the bearing cup hole is inserted into the drilled hole so that it seats against the shoulder. By rotating the tool and exerting a pressure through it against the surface of the shoulder for a brief period of time the surface of the bearing cup hole between the shoulder and the end of the bearing cup is deformed under a comparatively low pressure and due to the frictional heat produced by the rotation of the tool so that the deformed surface fixes the bearing cup within the yoke.

By means of this method of securing the bearing cup in the yoke, the use of the previously employed snap ring is eliminated and the assembly operation can be easily and quickly accomplished by caulking or deforming the surface of the bearing cup hole into engagement with the bearing cup. Further, due to the deformation of the yoke about the bearing cup, the cup is firmly fixed without any looseness within the bearing cup hole, thereby suppressing any unbalance in the driving shaft system and eliminating vibration.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

FIG. 1 is an elevational view, partly in section, of a cross-type universal joint formed in accordance with the present invention;

FIG. 2 is a sectional view, illustrating the arrangement of a bearing cup in a cross-type universal joint before it is fixed in place in accordance with the present invention;

FIG. 3 is a view similar to FIG. 2, however, indicating the bearing cup fixed within the cross-type universal joint; and FIG. 4 is a photograph showing the manner in which the bearing cup is fixed within the cross-type universal joint in accordance with the present invention.

DETAILED DESCRIPTION OF THE INVENTION

In FIG. 1 a Hooke's-type or cross-type universal joint is illustrated in which a bearing cup is assembled into the joint in accordance with the method of the present invention. In this type of universal joint, an input side yoke 2 is splined onto an output shaft (not shown) from a transmission with a sleeve yoke 3 extending from the input side yoke. A dust cover 1 is arranged about the input side yoke 2. On the opposite side of the joint from the output shaft a propeller shaft is arranged with an output side yoke 5 extending from it toward the sleeve yoke 3. The sleeve yoke 3 and the output side yoke 5 are positioned at right angles for each other. Each of the sleeve yoke 3 and output side yoke 5 have bearing cup holes 6 into which bearing cup 7 are secured. Needle roller bearings 8 are arranged within the bearing cup 7 to receive a cross-type shaft 9. The seal retainers 10 are positioned between the bearing cup 7 and the cross-type shaft 9. As indicated in FIG. 1, and as shown on an enlarged scale in FIG. 3, an inwardly deformed portion 12 of the surface of the bearing cup hole secures the bearing cup 7 within the yoke. Extending inwardly into the yoke on its surface opposite the bearing cup hole 6 is a hole 11 which extends inwardly through the yoke so that its base is within a common plane with the base of the bearing cup hole prior to the bearing cup being fixed in place. In the assembled position the deformed portion 12 is located between the base of the hole 11 and the adjacent end of the bearing cup 7.

As indicated above, FIG. 2 discloses the arrangement of the joint with the bearing cup inserted into the yoke but not fixed in place, while FIG. 3 shows the bearing cup 7 fixed in the yoke. Initially, the hole 11, having a diameter larger than the bearing cup hole 6, is formed into the yoke so that its base is in a common plane with the base of the bearing cup hole. Further, the hole 11 is drilled concentrically with the bearing cup hole 6 so that a shoulder 13 is formed in the base of the drilled hole 11 and defines the common plane between the two holes. The bearing cup 7 including the needle roller bearings 8 and the cross-shaft 9 are positioned within the bearing cup holes 6 so that the end face of the bearing cup 7 is spaced a slight distance from the common plane 14 which defines the base of both the bearing cup hole and the drilled hole. In securing a bearing cup 7 within the yokes 3, 5 a tool 15 is used which is shown in phantom lines in FIGS. 2 and 3. In FIG. 2 the tool 15 is shown spaced from the drilled hole 11 while in FIG. 3 the tool is shown inserted into the hole 11 in position for effecting the securement of the bearing cup to the yoke. In the step of fixing the bearing cup into the yoke, the tool 15 is rotated and pressure is exerted as it is forced against the surface defined by the shoulder 13 within the base of the hole 11. Due to the rotation of the tool and the pressure exerted on it, frictional heat is produced between it and the surface of the yoke which results in a plastic deformation of that portion of the surface of the bearing cup hole 6 extending between the shoulder 13 and the adjacent end of the bearing cup. Under a comparatively low pressure the surface of the yoke deforms inwardly forming the inward projection 12. This inward projection extends over the periphery of the end surface of the bearing cup and has the effect of caulking the bearing cup into fixed engagement within the yoke.

In FIG. 4 an illustration is provided of the manner in which the surface of the yoke deforms inwardly as exemplified by the inward projection 12 for securing the bearing cup in place. The following is an indication of the conditions and dimensions involved in the assembly of the bearing cup within the yoke of a cross-type universal joint, and these conditions and dimensions are given by way of example and not limitation. The diameter of the bearing cup hole 6 is 20 mm, while the diameter of the drill hole 11 is 21.5 mm. When the bearing cup 7 is inserted into the hole 6 it is spaced 1 mm from the common plane 14 of the bases of the bearing cup hole 6 and the drilled hole 11. The tool 15 used in fixing the bearing cup within the yoke has a diameter of 21 mm which is greater than the diameter of the bearing cup hole yet slightly less than the diameter of the drilled hole. During operation, the tool is rotated at 3,000 rpm and a pressure of 150 kg is applied for two seconds for fixing the bearing cup by providing an inward projection 12 of 0.5 mm. After the assembly operation has been completed the bearing cup and the yoke have the shapes as indicated in FIG. 4. As a result of this assembly operation, the looseness of the bearing cup in the direction of the cross-shaft was reduced to less than 0.01 mm and the breaking load was more than 1,000 kg. Further, the decrease in the hardness of the bearing cup was less than 10 according to Vickers' hardness. Therefore, a much improved method of securing the bearing cup within the yoke is possible than had been with the conventional methods. Preferably, the tool 15 is made of a heat-resistant cemented-carbide alloy having a high thermal strength to prevent any deformation of the tool and any deposition of the friction surfaces.

While a specific embodiment of the invention has been shown and described in detail to illustrate the application of the inventive principles, it will be understood that the invention may be embodied otherwise without departing from such principles.

What is claimed is:

1. A method of fixing a bearing cup in a yoke having a bearing cup hole in a Hooke's-type universal joint comprising the steps of drilling a hole having a diameter slightly greater than the diameter of the bearing cup hole into the surface of the yoke opposite and concentric with the bearing cup hole and forming the hole for a sufficient depth so that the base of the bearing cup hole and of the drilled hole are in a common plane, inserting a bearing cup into the bearing cup hole so that it is spaced slightly from the common plane containing the bases of the bearing cup hole and the drilled hole, inserting a tool into the drilled hole in contact with the surface of the yoke in the common plane of the bases of the bearing cup hole and the drilled hole, rotating the tool and exerting pressure against the surface of the yoke which is in the plane of the base of the drilled hole for deforming the surface of the yoke within the bearing cup hole and between the base of the bearing cup hole and the adjacent end of the bearing cup inwardly over the end of the bearing cup for fixing the bearing cup to the yoke.

2. A method, as set forth in claim 1, characterized therein by forming the drilled hole with a diameter of about 1.5 mm greater than the diameter of the bearing cup hole.

3. A method, as set forth in claim 1, characterized therein by spacing the bearing cup within the bearing cup hole about 1 mm from the common plane of the drilled hole and the bearing cup hole.

4. A method, as set forth in claim 2, characterized therein by employing a tool having a diameter about 0.5 mm less than the diameter of the drilled hole.

5. A method, as set forth in claim 4, characterized therein by employing a tool formed of a heat-resistant cemented-carbide alloy of high thermal strength.

6. A method, as set forth in claim 1, characterized therein by rotating the tool at about 3,000 rpm and applying a pressure of 150 kg on the tool against the surface of the yoke in the common plane of the bases of the bearing cup hole and drilled hole.

7. A method, as set forth in claim 1, characterized therein by providing the bearing cup hole with a diameter of 20 mm and drilling the drilled hole with a diameter of 21.5 mm, spacing the bearing cup 1 mm from the common plane of the bases of the bearing cup hole and the drilled hole, using a tool having a diameter of 21 mm, and rotating the tool at 3,000 rpm and exerting a pressure of 150 kg on the tool for a period of two seconds against the surface of the yoke in the base of the drilled hole.

* * * * *